United States Patent [19]
Ruth

[11] 3,962,997
[45] June 15, 1976

[54] ANIMAL FEEDER

[76] Inventor: Arthur P. Ruth, P.O. Box 11037, Houston, Tex. 77001

[22] Filed: July 5, 1974

[21] Appl. No.: 485,982

[52] U.S. Cl. .............................................. 119/51.11
[51] Int. Cl.² .............................................. A01K 5/02
[58] Field of Search .................. 119/51, 52, 53, 56, 119/51.11, 51.14, 56 R, 52 AF; 222/77

[56] References Cited
UNITED STATES PATENTS

| | | | |
|---|---|---|---|
| 3,150,798 | 9/1964 | Sutton | 222/77 |
| 3,254,729 | 6/1966 | Behlen | 119/56 R |
| 3,345,055 | 10/1967 | Kutscher et al. | 222/77 |
| 3,754,527 | 8/1973 | Jenkins | 119/51.11 |

Primary Examiner—Louis G. Mancene
Assistant Examiner—Peter K. Skiff

[57] ABSTRACT

An animal feeder shown in two embodiments which incorporates a storage bin for receiving a supply of granular animal feed wherein the bin has a removable top to protect the animal feed from the elements, an opening at the bottom where the animal feed pours from the bin onto a plate. An auger extends across the plate. The auger is rotated at a controlled rate by a motor. The auger forces a controlled quantity of feed during an interval to advance along the auger to the edge of the plate to fall thereafter down a chute, dispensed for feeding in the first embodiment. In the second embodiment, the chute empties into a storage container which stores and dumps animal feed. The second embodiment also supplies all of the animal feed from the storage container at one instant while the first embodiment provides the animal feed continuously over an interval of time.

4 Claims, 4 Drawing Figures

ANIMAL FEEDER

BACKGROUND OF THE INVENTION

In the raising of pets and in the keeping of livestock, the owner often wants to be free of the necessity of daily feedings. Many animals require feed twice a day. The animal may be kept in a remote pen of a pasture, making it difficult for the owner to be in attendance. Accordingly, the present invention is intended to serve as an animal feeder which dispenses and delivers animal feed to the animals, including pets, domesticated livestock, or wildlife. The apparatus of the present invention is therefore intended as a feeder which dispenses a specified quantity of feed.

SUMMARY OF THE PRESENT INVENTION

The present invention is summarized as an auger driven animal feeder which incorporates a storage bin which has a removable top to enable a substantial quantity of feed to be placed in a single bin. The bin tapers downwardly to a bottom opening which is spaced above a plate, permitting feed to cascade therethrough and accummulate in a pyramid. A motor drives an auger which extends through the pyramid of feed. The auger advances feed to a chute where it falls downwardly for feeding. In the first embodiment, the chute deposits the feed for eating. In the second embodiment, the chute deposits the feed in a container mechanism. When the container mechanism fills to a certain weight, it tilts and dumps, thereby supplying all of the feed for feeding at a specific instant. The container mechanism is counterbalanced so that it returns to the original position after dumping.

DESCRIPTION OF THE PREFERRED EMBODIMENTS

Figure 1:
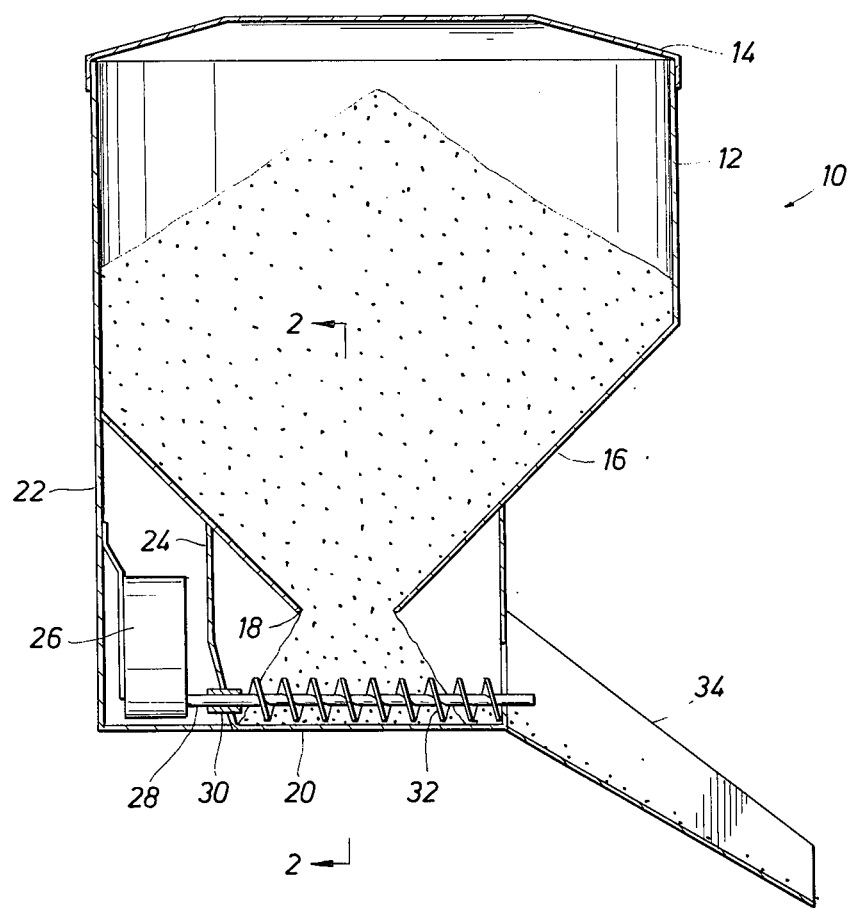
FIG. 1 is a sectional view through the first embodiment of the present invention showing an auger for supplying animal feed.

Attention is directed to FIG. 1 of the drawings where the first embodiment is identified by the numeral 10. The animal feeder 10 incorporates a storage bin 12 of substantial size which has a removable lid or cover 14. The lid 14 has a downwardly projecting lip thereabout. This enables the lid to close about the bin and prevent the intrusion of rainwater or the like should the feeder be used at an outdoor location.

The storage bin 12 receives a substantial quantity of food which is typically in granular form. The bin 12 has a downwardly tapering wall 16 which serves somewhat as a funnel extending downwardly to a central opening 18. The opening 18 is parallel to and spaced above a bottom or support plate 20. The plate 20 thus accummulates a pile of the animal feed, the volume of the pyramid being determined by the granular nature of the feed, spacing to the opening 18 and the diameter of the opening.

A brace 22 which is preferably a continuation of a portion of the side wall of the container 12 extends downwardly to the plate 20. A second tab 24 extends downwardly and approximately parallel to the first tab 22. The brace or tab 22 supports a motor 26 which has a housing integrally containing a gear reducer mechanism to rotate a shaft 28 at a controlled rate. The shaft 28 extends from the gear box and passes through a guide sleeve or bushing 30. The bushing 30 is supported by the tab or bracket 24. The bushing cooperates with the shaft to align an auger 32. The auger has a single helix in which multiple flights of the helix are shown in FIG. 1. The motor is so positioned and the bushing is appropriately aligned to support the auger extending through the accummulated pile of animal feed on the plate 20. It is rotated in a direction to advance the animal feed from left to right as viewed in FIG. 1. Thus, it is carried toward the edge of the plate 20.

Figure 2:
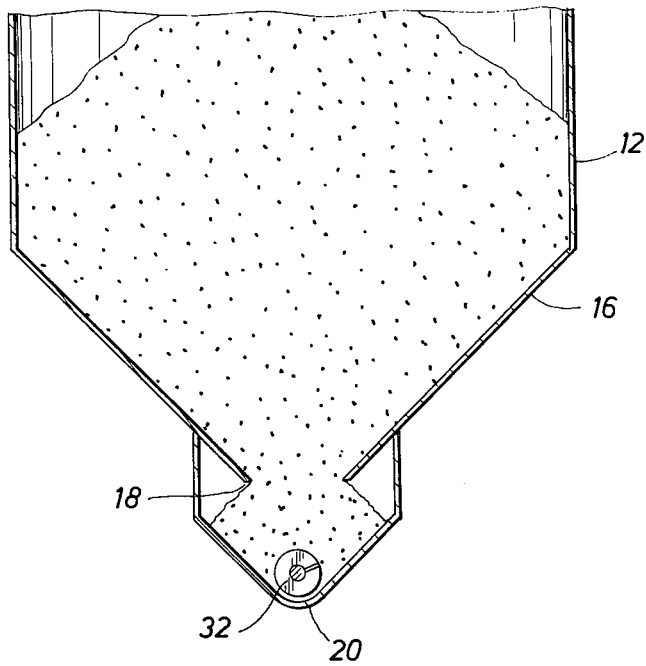
FIG. 2 is a sectional view along the line 2 — 2 of FIG. 1 disclosing the relationship of the auger to the storage bin.

Attention is next directed to FIG. 2 of the drawings which shows additional details. The opening 18 is shown just above the plate 20. The plate 20 is not limited to a planar construction and indeed, FIG. 2 shows it to be V-shaped. The plate thus funnels the pile of animal feed to the vicinity of the auger 32. This causes the feed to engage the flights of the auger and hence, it is steadily advanced off the edge of the bottom plate 20 into a chute 34 which is shown in FIG. 1.

In operation, a substantial quantity of feed is placed in the storage container 1 and the motor 26 is turned on. The auger rotates in a direction to advance animal feed onto the chute 34. Upon filling, the feed falls through the opening 18 and piles up to a point where the opening 18 is blocked to additional accummulation of feed therebelow. As the auger advances some of the feed from the accummulation, the feed in the bin continues to fall through the opening 18 so that the accummulation of feed below the opening 18 and above the plate 20 remains approximately constant until the bin 12 is emptied. The auger takes up the granular feed and advances it into the chute 34 at a controlled rate.

Figure 3:
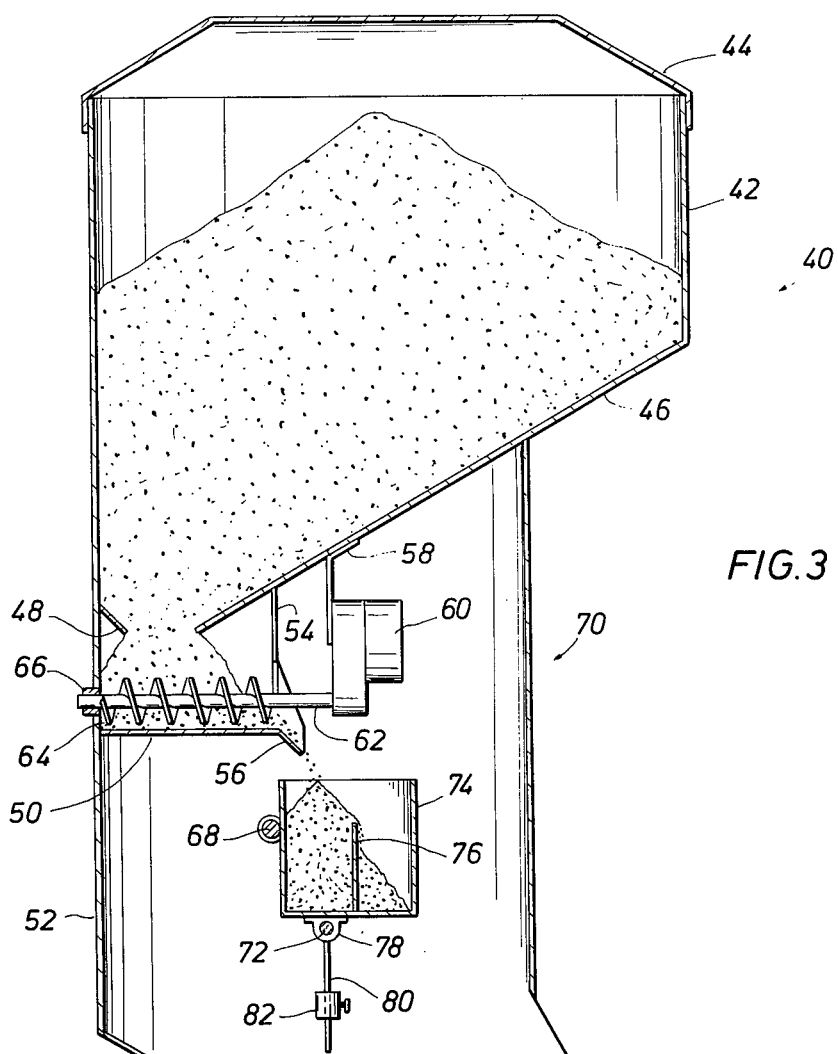
FIG. 3 is a sectional view through an alternative embodiment similar to the FIG. 1 adding a storage container so that the food is accummulated and supplied in a large batch; and, FIG. 4 is a view similar to FIG. 3 showing the container mechanism which dumps the feed after accummulation of a specific weight.

Attention is next directed to FIG. 3 of the drawings which illustrates an alternative embodiment. In FIG. 3, another embodiment is indicated by the numeral 40 and includes a storage bin 42. The bin 42 is closed by a top 44 which is of similar construction as the top 14. The storage bin has a tapered wall 46 which extends downwardly to a central opening 48. The opening is located off center but functions in the same manner as the opening 18 shown in FIG. 1, namely to funnel animal feed therethrough onto a support plate 50. The plate 50 is identical to the plate 20 in that it is preferably V-shaped. It is attached to the outer wall of the animal feed, the wall 52 extending below the opening 48 shown in FIG. 3. The wall 52 is preferably either rectangular or cylindrical in cross-section. It surrounds the feed mechanism and operates in a manner to be described.

The V-shaped plate 50 is attached at one end to the wall 52. A bracket 54 supports the other end. The V-shaped plate terminates in a short chute 56.

A mounting bracket 58 supports a case or housing 60 which encloses a motor and gear box. The gear box is connected to a drive shaft 62. The shaft 62 connects to an auger 64. The auger is aligned in the bottom trough of the V-shaped plate 50. Its alignment is secured and maintained by the mounting bracket 58 which positions the motor 60. In addition, the auger terminates at a bushing 66 which supports and enables rotation of the shaft and auger. The bushing 66 is supported in the sidewall 62.

The numeral 68 identifies a shaft which extends at least part way across the housing. It will be recalled that the sidewall 52 is one wall of a housing located below the bin. The shape of the housing is not particularly critical in that it can be rectangular or circular or any other shape for that matter. The shaft 68 serves as a stop or limit mechanism and to this end, it is preferably anchored to opposite walls of the housing. The housing is generally indicated by the numeral 70 and is shown as an appendage below the bin 42. The housing 70 is a surrounding structure which protects the illustrated feed metering mechanism from the elements. For instance, exposure to rain might cause the animal feed to cake, thereby intefereing with the operation of the mechanism. This, of course, varies dependent on the nature of the feed.

The shaft or stop mechanism 68 spans across the housing for purposes to be described. It is preferably anchored at both ends although it can be cantilevered. The numeral 72 identifies a second and parallel shaft which serves as a pivot. It is a pivot for a storage container 74 which has an internal divider wall 76. The storage container is open at the top and is mounted on a bracket 78 which engages the shaft 72. As viewed in FIG. 3, the pivot for the storage container 74 is to the left of center. The internal wall 76 causes animal feed to accummulate on the left side until the accummulation rises above the wall 76. The wall 76 preferably is shorter than the outer wall of the container 74 as illustrated in FIG. 3. Thus, animal feed accummulates to the left of the wall 76. So long as the accummulation is to the left and hence the center of gravity is shifted to the left, the container tends to remain upright. It is positioned below the chute 56 to receive all the grain or feed from the chute 56. The feed thus accummulates maintaining a stable center of gravity. However, when it begins to overflow the wall 76 and accummulate on the right of it as illustrated in FIG. 3, the center of gravity is shifted to the right. At some point in time, the added weight of feed on the right of the wall 76 pushes the center of gravity to the right past the shaft 72, causing the container 74 to rotate in a clockwise manner about the shaft and dumping feed.

Figure 4:
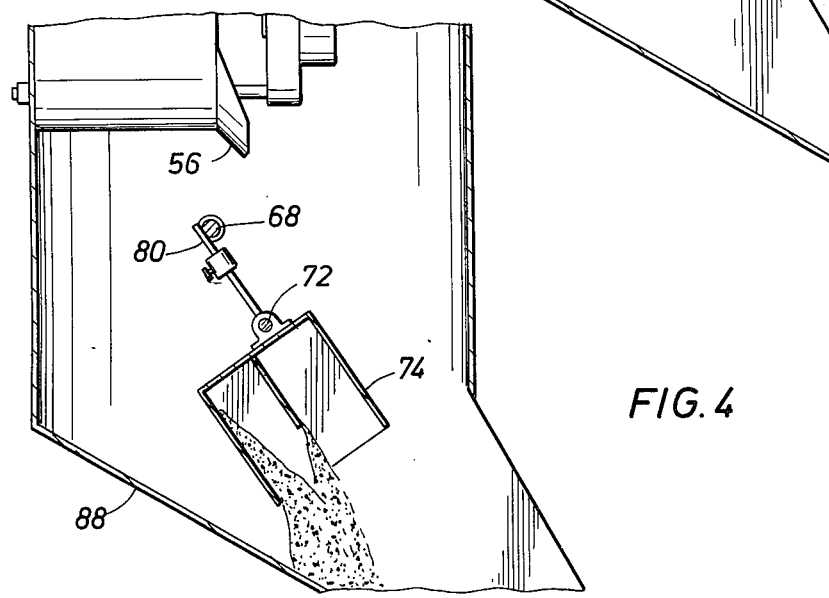

A rod 80 extends downwardly from the container 74. The rod 80 carries an adjustable counterweight 82, the location of which is adjustable along the length of the rod. The counterweight 82 is sufficiently large to offset the weight of the empty container. Thus, after the container rotates to the right, the animal feed is dumped. After it has been dumped, the weight 82 is sufficiently large to force the container to rotate in a counterclockwise direction about the shaft 72. This is shown in FIG. 4 of the drawings. After the feed has been dumped in FIG. 4, the mechanism is unstable and rotates to the original upright position. The upright position is thus determined by the stop or shaft 68. In addition, the weight and rod arrangement are limited in rotation by the shaft. For this reason, the rod 80 is sufficiently long to catch the shaft 68.

The housing 70 terminates in a larger chute 88 below the storage container. The animal feed falls on the chute 88 and it is then dispensed at a point exposed for animal feeding.

In operation, the bin 42 is filled to an adequate level. The feed falls through the opening 48 and forms a pyramid which tends to block the opening. The pyramid of feed surrounds the auger 64. As the motor 60 is operated, the flights of the auger engage and advance the feed. It falls off the small chute 56 into the storage container 74. The storage container takes the steady supply of feed and accummulates it for a large serving. A large serving is dispensed in the manner described above when the storage container 74 is adequately filled. The enhanced embodiment 40 has the advantage over the embodiment 10 that it accummulates the animal feed for one large serving rather than supplying a continuous dribble of feed. For some livestock, pets and other animals, the embodiment 10 is to be preferred while in other instances, the embodiment 40 is to be preferred.

The foregoing is directed to the preferred embodiments, but the scope hereof is determined by the claims which are appended hereto.

I claim:
1. An Animal feeder comprising:
   a storage bin adapted to receive and store a supply of granular animal feed and having an opening in the lower portions thereof;
   a plate positioned below said opening for accumulating animal feed thereon from said storage bin;
   an auger means between said plate and the opening in said storage bin, said auger means having a set of flights thereon for agitating animal feed;
   raised side means adjacent to said plate on opposite sides of said auger means for capturing animal feed therebetween, said auger means being positioned to agitate animal feed on said plate;
   a fillable container having a specified capacity below an edge of said plate to receive and store animal feed falling from said plate;
   means for periodically tilting and dumping feed from said container;
   a pivot mounting for said container; and
   an internal wall in said container arranged such that an accumulaton of animal feed therein alters the center of gravity and causes said container to pivot about said pivot.

2. The apparatus of claim 1 including a counter balance weight attached to said container such that said container is filled and acts against said counter weight and tips an accummulation of specified weight of feed.

3. The apparatus of claim 2 including a stop and spaced pivot member, said stop limiting rotation of said container about said pivot member.

4. The apparatus of claim 3 including first and second compartments divided by said wall, one being arranged to be filled partly before the other and the latter being arranged to tip and rotate said container.

* * * * *